US 8,714,979 B2

(12) United States Patent
Leonard et al.

(10) Patent No.: US 8,714,979 B2
(45) Date of Patent: May 6, 2014

(54) MISSILE SIMULATOR

(75) Inventors: James Victor Leonard, St. Charles, MO (US); Robert Kastner Menzel, Lake Saint Louis, MO (US); Richard E. Meyer, Florissant, MO (US); Aaron L. Eggemeyer, Chester, IL (US); William J. Ebert, II, Kirkwood, MO (US); William J. Ebert, III, legal representative, Kirkwood, MO (US); Joshua Ryan Pollema, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 858 days.

(21) Appl. No.: 12/388,778

(22) Filed: Feb. 19, 2009

(65) Prior Publication Data
US 2010/0209880 A1    Aug. 19, 2010

(51) Int. Cl.
*F41F 7/00* (2006.01)

(52) U.S. Cl.
USPC .................. 434/12; 434/11; 434/14; 434/15; 434/29; 434/30; 434/35

(58) Field of Classification Search
USPC ............ 35/25; 434/11, 14, 15, 21–23, 25, 12, 434/16; 89/1.815, 1.804; 324/537; 345/156; 710/69; 42/70.08; 382/115
See application file for complete search history.

(56) References Cited

U.S. PATENT DOCUMENTS

| | | | |
|---|---|---|---|
| 3,960,000 A | | 6/1976 | Barnett et al. |
| 4,232,456 A | * | 11/1980 | Harmon et al. ................. 434/12 |
| 5,034,686 A | * | 7/1991 | Aspelin ......................... 324/537 |
| 5,378,155 A | * | 1/1995 | Eldridge ........................ 434/11 |
| 5,603,179 A | * | 2/1997 | Adams ........................ 42/70.08 |
| 6,584,881 B1 | * | 7/2003 | Boudreau et al. ............ 89/1.804 |
| 7,228,261 B2 | | 6/2007 | Leonard et al. |
| 7,231,862 B1 | * | 6/2007 | Quinn ......................... 89/41.05 |
| 7,335,026 B2 | * | 2/2008 | Goree et al. .................... 434/22 |
| 2003/0089220 A1 | * | 5/2003 | Boudreau et al. ............ 89/1.815 |
| 2006/0285725 A1 | * | 12/2006 | Recce ........................... 382/115 |
| 2008/0122786 A1 | * | 5/2008 | Pryor et al. ................... 345/156 |
| 2010/0099059 A1 | * | 4/2010 | Burford ......................... 434/16 |
| 2010/0217899 A1 | * | 8/2010 | Sitzmann et al. ............... 710/69 |

* cited by examiner

*Primary Examiner* — Nikolai A Gishnock
*Assistant Examiner* — Randall N Crenwelge
(74) *Attorney, Agent, or Firm* — Yee & Associates, P.C.

(57) ABSTRACT

A method and apparatus for simulating a missile. A simulation program for a weapon using a processor unit is executed in a simulation unit. A number of input signals is received from a control station in a vehicle through an interface system connected to a weapons interface on the vehicle. The interface system is in communications with the processor unit. The control station is capable of operating the weapon connected to the weapons interface. A number of output signals is generated using a simulation of the weapon. The number of output signals is sent through the weapons interface to the control station.

20 Claims, 8 Drawing Sheets

MISSILE SIMULATOR

BACKGROUND INFORMATION

1. Field

The present disclosure relates generally to data processing systems and, in particular, to a method and apparatus for simulating a missile.

2. Background

A missile is a self-propelled projectile and is typically propelled by a rocket and/or a jet engine. Further, a missile may normally have an explosive warhead, although other types of weapons may be included in a missile.

A missile may be guided to a target in a number of different ways. For example, a missile may target radiation to find the target. For example, a laser may be pointed to a target. Also, the missile may be guided to a target based on the location of the target using a guidance system located inside the missile. The guidance system may rely on a global positioning signal to identify the location of the missile relative to the location of the target.

A missile may be carried on a number of different types of objects. For example, missiles may be located on a ship, an aircraft, a tank, and/or some other suitable type of object.

Operators may be trained to operate a missile in a number of different ways. For example, the training may involve a simulation or training system that simulates a control station at which the operator operates a missile. In other words, this type of simulation device may be a mock up or replica of a control station used to operate a missile. These simulation stations may be complex, expensive, and/or bulky.

Additionally, these training systems are expensive. As a result, the number of training systems available may be less than desired for training an operator to operate a missile. These training systems also are complex and heavy. Moving the training systems to different locations may be expensive and time consuming. Thus, the operators typically travel to the simulator systems for training.

Training also may be provided at an actual control station located in an aircraft using actual missiles. The control station in an aircraft may be used to activate an actual missile. The control station also may be used to show an operator what signals and/or responses may be received from a missile. Further, an operator may use the control station to download mission plans, as well as perform other operations with the missile. This type of training, however, may be undesirable as well as expensive.

Training with a missile places wear and tear on the missile. As a result, the service life of a missile may be decreased when used in training operations. Further, a simulated launch cannot be performed with a real missile. Instead, the actual launch of a missile requires the missile to actually be fired. This type of training increases cost when a missile is actually fired.

Therefore, it would be advantageous to have a method and apparatus that takes into account at least some of the issues discussed above, as well as possibly other issues.

SUMMARY

In one advantageous embodiment, an apparatus comprises a housing, a processor unit located within the housing, a storage device, and a simulation program. The processor unit is capable of communicating with a control station in a vehicle for operating weapons. The storage device is located in the housing and is in communication with the processor unit. The simulation program is stored on the storage device. The simulation program is capable of being executed by the processor unit to simulate a plurality of different types of weapons. The simulation program is capable of processing a number of input signals received from the control station used in the vehicle in a simulation of a selected weapon in the plurality of different types of weapons. The simulation program is also capable of generating a number of output signals from the simulation of the selected weapon.

In another advantageous embodiment, a method is present for simulating a missile. A simulation program for a weapon using a processor unit is executed in a simulation unit. A number of input signals is received from a control station in a vehicle through an interface system connected to a weapons interface on the vehicle. The interface system is in communication with the processor unit. The control station is capable of operating the weapon connected to the weapons interface. A number of output signals is generated using a simulation of the weapon. The number of output signals is sent through the weapons interface to the control station.

In yet another advantageous embodiment, a method is present for simulating a missile. A simulation program for a weapon is executed using a processor unit in a simulation unit located inside of a vehicle. A number of input signals is received from a control station in the vehicle through an interface system connected to the control station. The interface system is in communication with the processor unit. The control station is capable of operating the weapon, and the interface system is in communication with the processor unit using a first communications link that is different from a second communications link through a weapons interface in the vehicle. A number of output signals is generated using a simulation of the weapon. The number of output signals is sent through the interface system to the control station.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
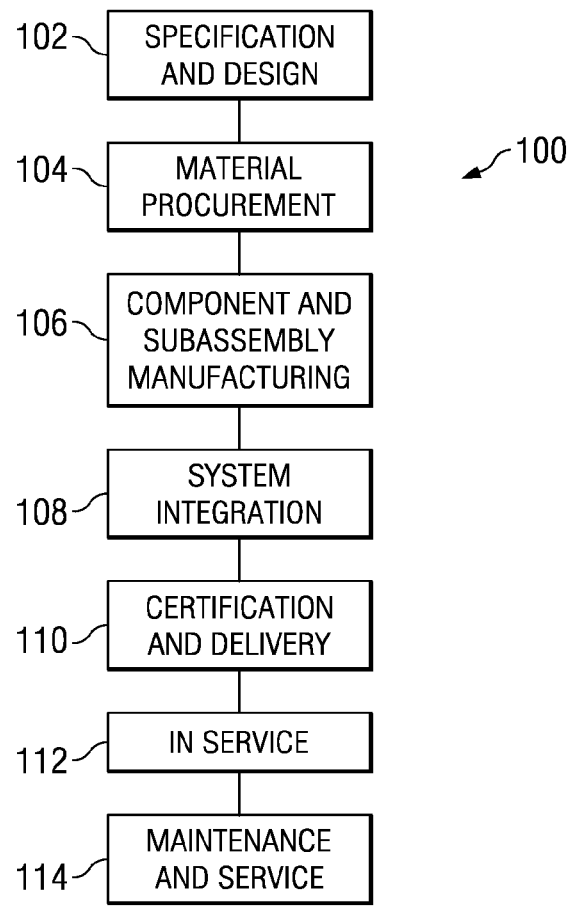
FIG. 1 is a diagram illustrating an aircraft manufacturing and service method in accordance with an advantageous embodiment.
Figure 2:
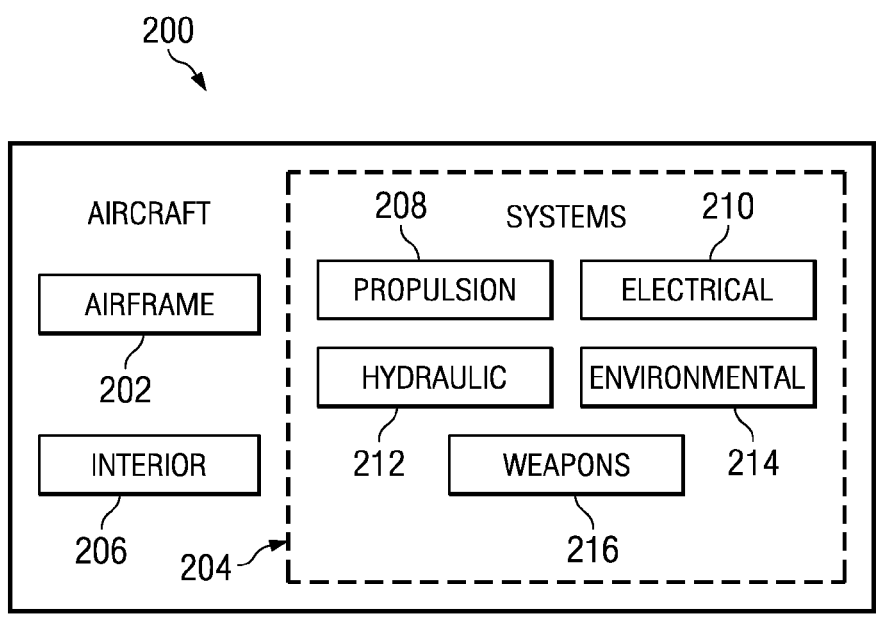
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and weapons system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As one example, the different advantageous embodiments may be used during in service 112 to provide training on the operation of weapons system 216. Further, the different advantageous embodiments also may be used during maintenance and service 114 to aid in performing maintenance operations on weapons system 216.

The different advantageous embodiments recognize and take into account that currently available simulation systems may be stand-alone systems that are a mock up or replica of a control station used in an aircraft to operate a missile. The different advantageous embodiments recognize and take into account that these types of systems may limit the training that may be performed.

For example, without limitation, the different advantageous embodiments recognize and take into account that moving these training systems from one location to another location may be time consuming and expensive. Further, the different advantageous embodiments recognize and take into account that these types of training systems may have an expense that may limit the number of training systems that may be purchased for training operators.

The different advantageous embodiments recognize and take into account that problems may exist with training an operator using an actual control station and a missile. The different advantageous embodiments recognize and take into account that performing simulations with actual missiles may reduce the service life of the missiles. The different advantageous embodiments recognize and take into account that even with a capability to use a live missile, a simulated launch cannot be performed. Further, the different advantageous embodiments recognize and take into account that security concerns may be present in using an actual missile for simulations.

The different advantageous embodiments also recognize and take into account that performing maintenance on missile systems may be time consuming and expensive. The different advantageous embodiments recognize and take into account that the time needed to determine whether a control station and/or connections to a weapons interface are operating correctly may require the presence of actual missiles to determine whether the control station, the connections to the missile, and/or the weapons interface to the missile are operating correctly.

Thus, the different advantageous embodiments provide a method and apparatus for simulating missiles. These simulations may be used to train operators and/or perform maintenance on a weapons system, such as a missile system. In the different advantageous embodiments, an apparatus may comprise a housing, a processor unit, a storage device, and a simulation program. The processor unit is capable of communicating with a control system in a vehicle for controlling weapons.

The storage device is in communication with the processor unit. The simulation program is stored on the storage device. The simulation program is capable of being executed by the processor unit to simulate a plurality of different types of weapons, process a number of signals received from the control station by the processor unit in a simulation of a selected weapon in the plurality of weapons, and generate a number of output signals from the simulation.

The apparatus, in a number of the different advantageous embodiments, may have multiple uses. For example, without limitation, the apparatus may be used to train operators to operate a weapons system and/or perform maintenance operations on a missile system.

Figure 3:
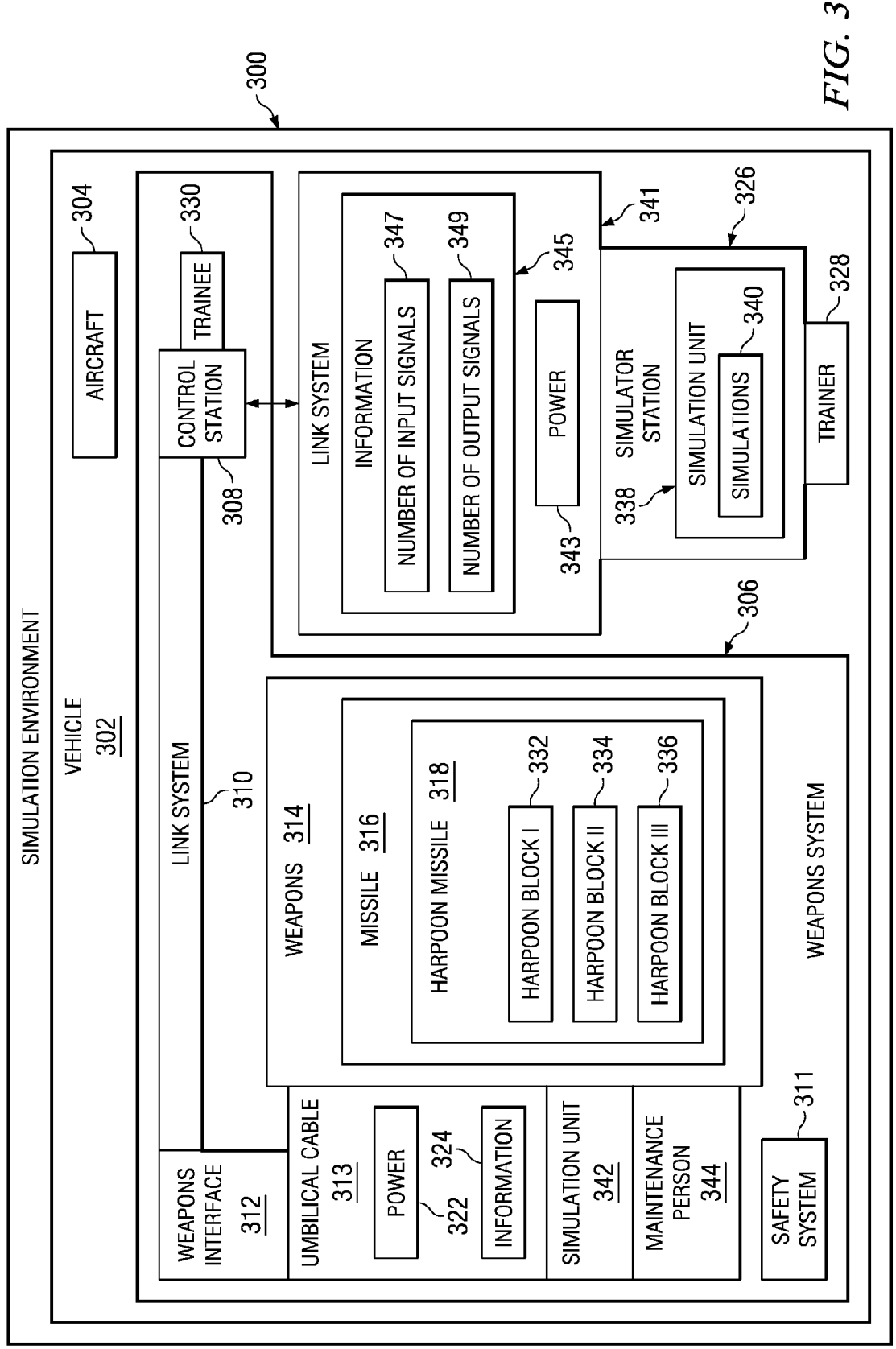
FIG. 3 is an illustration of a simulation environment in accordance with an advantageous embodiment.

Turning now to FIG. 3, an illustration of a simulation environment is depicted in accordance with an advantageous embodiment. In this example, simulation environment 300 may include vehicle 302. Vehicle 302 may be, for example, aircraft 304. Aircraft 304 may be implemented using an aircraft, such as aircraft 200 in FIG. 2.

In this example, aircraft 304 includes weapons system 306. In this illustrative example, weapons system 306 includes control station 308, link system 310, safety system 311, weapons interface 312, umbilical cable 313, and weapons 314.

Control station 308 may be any device capable of being used to operate weapons 314. Control station 308 may be, for example, without limitation, a computer, a controller, and/or some other suitable device. Further, control station 308 also may have specialized seating, controls, displays, and/or other suitable devices for operating a missile. Control station 308 may be located aft of the cockpit in aircraft 304.

Link system 310 may connect control station 308 to weapons interface 312. Link system 310 may provide a capability to transfer information between control station 308 and weapons 314 connected to weapons interface 312. Link system 310 also may provide power to weapons 314. Link system 310 may take the form of a number of cables. In other advantageous embodiments, link system 310 may take the form of a wireless communications link or a combination of wireless and physical connections.

Weapons interface 312 may provide an interface to provide a connection to weapons 314. Weapons 314 may be, for example, missile 316, and, in particular, may take the form of harpoon missile 318.

Umbilical cable 313 may connect harpoon missile 318 to weapons interface 312. Umbilical cable 313 may provide a capability to supply power 322 to harpoon missile 318. Further, umbilical cable 313 also may provide a medium to transfer information 324 between harpoon missile 318 and control station 308. This information may include, for example, status information about harpoon missile 318, commands, mission plans, and other suitable information.

Aircraft 304 also may have simulator station 326. Simulator station 326 may be operated by an operator, such as trainer 328, to train trainee 330 located at control station 308. In these illustrative examples, trainer 328 may select a number of different types of weapons from weapons 314 for training with trainee 330 at control station 308. For example, harpoon missile 318 may have different versions. Harpoon missile 318 may be Harpoon Block I 332, Harpoon Block II 334, or Harpoon Block III 336.

In these examples, simulator station 326 includes simulation unit 338. Link system 341 provides a connection to control station 308 that is separate and/or isolated from the connection provided through weapons interface 312. Link system 341 may allow power 343 and information 345 to be exchanged between simulation unit 338 and control station 308. This information may take the form of number of input signals 347 and number of output signals 349 to simulation unit 338.

Simulation unit 338 generates simulations 340 for weapons 314. Simulation unit 338 is connected to control station 308 using link system 341.

Safety system 311 prevents simulation unit 342 from communicating with a weapon connected to weapons interface 312 that is connected to control station 308. If a weapon connected to weapons interface 312 is selected through simulation unit 338 through link system 341, safety system 311 will cause weapons system 306 to enter an abort state, in which no actions can be taken. This abort state acts as a safety mechanism to prevent accidental operation of a weapon during a simulation. As a result, simulations 340 cannot be performed when a weapon is present at weapons interface 312 in these illustrative examples. Safety system 311 is capable of preventing the generation of at least one of input signals by control station 308 and output signals by simulations 340 in simulation unit 338.

As used herein, the phrase "at least one of", when used with a list of items, means that different combinations of one or more of the items may be used and only one of each item in the list may be needed. For example, "at least one of item A, item B, and item C" may include, for example, without limitation, item A, or item A and item B. This example also may include item A, item B, and item C, or item B and item C.

Further, in the different advantageous embodiments, simulation unit 342 may be used by maintenance person 344 to perform maintenance operations on weapons system 306. In these different illustrative examples, simulation unit 342 may be connected to weapons interface 312 using umbilical cable 313. Umbilical cable 313 also may be used to provide a connection to weapons interface 312 and link system 310 for power and/or information exchange between simulation unit 342 and control station 308. In these examples, the connection uses link system 310, which is the same path used by an actual weapon connected to weapons interface 312.

The illustration of simulation environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the different blocks illustrated in FIG. 3 may depict some functional components that may be combined and/or divided into different blocks when implemented in different advantageous embodiments.

For example, in some advantageous embodiments, weapons 314 may take other forms other than missile 316. For example, weapons 314 may take the form of a cannon, a laser, and/or any other suitable weapon. Further, in other advantageous embodiments, missile 316 may be any cruise missile, rather than a harpoon missile. Further, in some advantageous embodiments, simulation unit 338 may be located at control station 308. In still other advantageous embodiments, control station 308 may be located in the cockpit of aircraft 304, rather than behind the cockpit.

Figure 4:
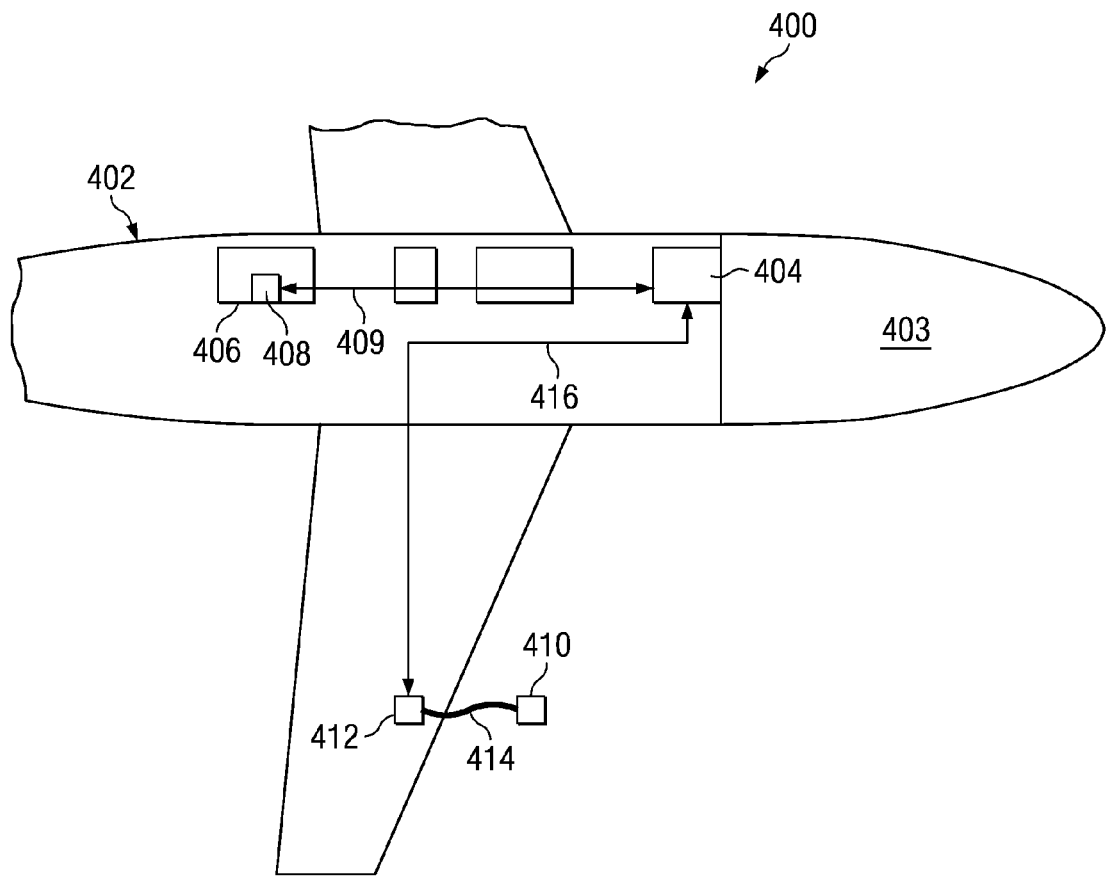
FIG. 4 is a diagram of a simulation environment in accordance with an advantageous embodiment.

Turning now to FIG. 4, a diagram of a simulation environment is depicted in accordance with an advantageous embodiment. In this example, simulation environment 400 is an example of one implementation of simulation environment 300 in FIG. 3.

In this illustrative example, aircraft 402 may include control station 404, at which a trainee may sit to train on the use of weapons for aircraft 402. Additionally, aircraft 402 includes simulator station 406, which contains simulation unit 408. Simulation unit 408 is an example of one implementation of simulation unit 342 in FIG. 3. In this example, control station 404 is located within cockpit 403 in aircraft 402. Simulation unit 408 is connected to control station 404 through link system 409. In these illustrative examples, simulation unit 408 may be mounted at simulator station 406 and may provide output signals in response to signals generated by control station 404.

An instructor may be located at simulator station 326 in FIG. 3 and perform simulations of weapons for a trainee located at simulator station 406. In this manner, a trainee may perform training in simulation environment 400 in a manner that is closer to a real mission, as compared to using a currently available simulation system on the ground. Further, aircraft 402 may be in the air during simulation training. Also, this training may be performed without using a missile. As a result, security concerns, wear and tear, and other undesirable consequences may be reduced and/or eliminated.

In these illustrative examples, simulation unit 410 also may be used to perform maintenance operations on aircraft 402. Simulation unit 410 may be connected to weapons interface 412 using umbilical cable 414. Weapons interface 412 is connected to control station 404 by link system 416. Weapons interface 412 also may exchange signals with a weapon connected to weapons interface 412 or simulation unit 410.

These signals contain information normally exchanged with a weapon connected to weapons interface 412. In these examples, simulation unit 410 may simulate a weapon to determine whether weapons system 306 in FIG. 3 is operating properly. In other words, a determination may be made as to whether components, such as control station 404, link system 416, weapons interface 412, and/or any other components in a weapons system, are operating as desired.

In these illustrative examples, the weapons system in aircraft 402 is designed such that if a missile is connected to a weapons interface for a control station that is the one being used for simulation, when power is applied, the weapons system will lock up and not allow usage of the weapons system until the missile is removed and the weapons system is reinitialized. Of course, other types of safety features may be implemented, depending on the particular embodiment.

Figure 5:
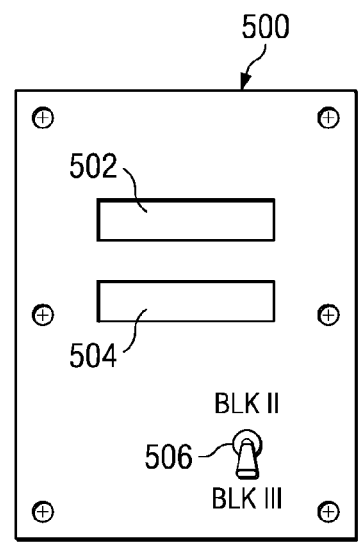
FIG. 5 is a diagram illustrating a simulation unit in accordance with an advantageous embodiment.

With reference now to FIG. 5, a diagram illustrating a simulation unit is depicted in accordance with an advantageous embodiment. Simulation unit 500 is an example of one implementation of simulation unit 410 in FIG. 4.

In this illustrative example, simulation unit 500 may include displays 502 and 504, which may be used to present information about a simulation being executed by simulation unit 500. In this illustrative example, control 506 may be used to select between different weapon simulations. Simulation unit 500 also may be designed and/or configured for rack mounting in an aircraft. Simulation unit 500 may be located at a simulation station in an aircraft in these illustrative examples.

Figure 6:
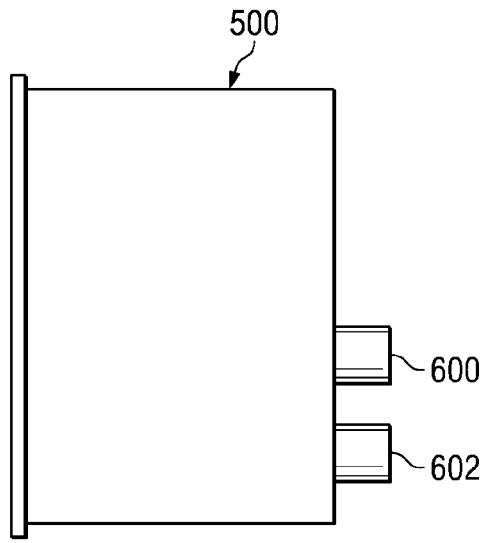
FIG. 6 is a side view of a simulation unit in accordance with an advantageous embodiment.

Turning now to FIG. 6, a side view of a simulation unit is depicted in accordance with an advantageous embodiment. In this example, simulation unit 500 may have connector 600 and connector 602. These connectors may be connected to a link system to provide communication with a control station. Each of these connectors may provide a different connection to a control station to provide signals for a particular type of weapon. Different connectors may be used to provide an input to a control station to allow for a transfer of information between the control station and simulation unit 500.

Figure 7:
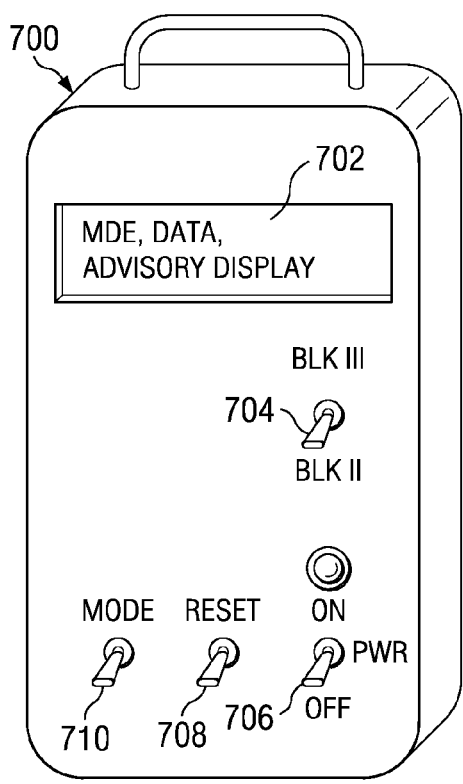
FIG. 7 is a diagram of a simulation unit in accordance with an advantageous embodiment.

Turning now to FIG. 7, a diagram of a simulation unit is depicted in accordance with an advantageous embodiment. In this example, simulation unit 700 may be used to perform maintenance operations on an aircraft. Simulation unit 700 may be a portable simulation unit or installed as rack mounted.

As illustrated, simulation unit 700 may have display 702 for displaying information about a simulation. Control 704 may be used to select between different simulations. Additionally, control 706 may be used to turn simulation unit 700 on and off. Control 708 may be used to reset the simulation unit, while control 710 may be used to select a simulation mode for simulation unit 700. In these examples, the simulation mode may be normal and fault. Normal is a mode that simulates operations for a use of the weapon. Fault is a mode that simulates faults that may occur in operating the weapon.

Figure 8:
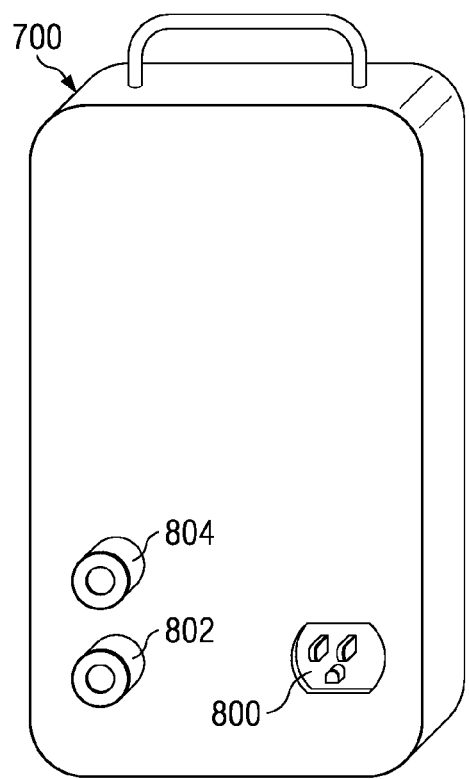
FIG. 8 is a diagram of a rear view of a simulation unit in accordance with an advantageous embodiment.

With reference now to FIG. 8, a rear view of simulation unit 700 is depicted in accordance with an advantageous embodiment. In this illustrative example, simulation unit 700 may have power connection 800. Power connection 800 may provide power to operate simulation unit 700.

Additionally, simulation unit 700 also may have umbilical connector 802 and umbilical connector 804. These umbilical connectors may provide a connection to different types of weapons interfaces for different types of weapons. For example, umbilical connector 802 may be an umbilical connector for a Harpoon Block II missile, while umbilical connector 804 may be a connector for a Harpoon Block III missile.

The illustration of simulation unit 500 in FIGS. 5 and 6 and simulation unit 700 in FIGS. 7 and 8 are only presented for purposes of illustrating one manner in which simulation units may be implemented. In other advantageous embodiments, a simulation unit may have other components in addition to or in place of the ones illustrated. Further, in some advantageous embodiments, some of the features illustrated may be unnecessary.

For example, in some advantageous embodiments, the controls illustrated for selecting a simulation may be unnecessary. Instead, the displays may be touch panels that may present information as well as receive commands and/or input from a user interacting with the touch panel. In yet other advantageous embodiments, a simulation unit may be used both for training and/or maintenance.

Figure 9:
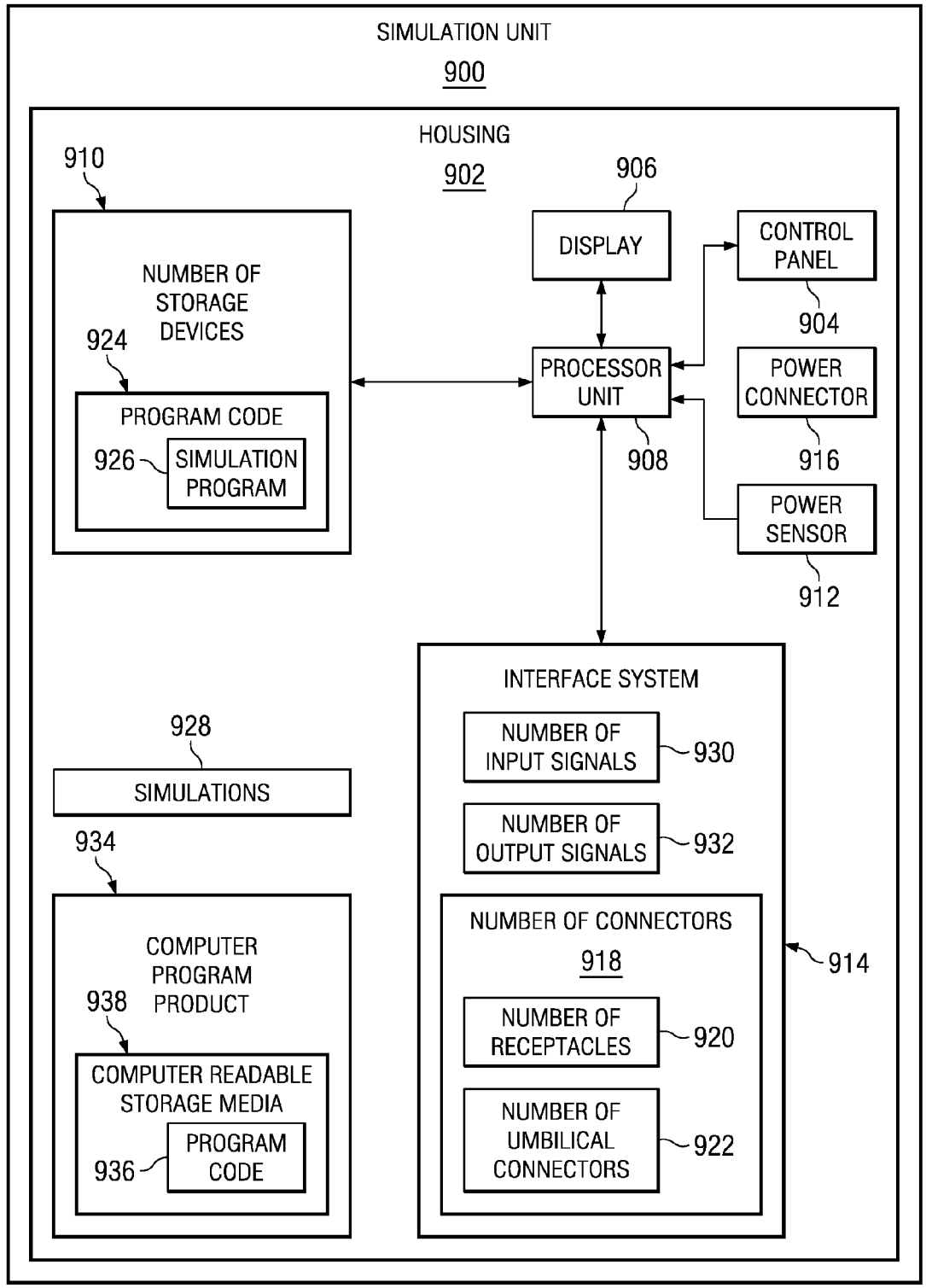
FIG. 9 is an illustration of a block diagram of a simulation unit in accordance with an advantageous embodiment.

With reference now to FIG. 9, an illustration of a block diagram of a simulation unit is depicted in accordance with an advantageous embodiment. In this illustrative example, simulation unit 900 is an example of one implementation for simulation unit 338 and/or simulation unit 342 in FIG. 3.

In this illustrative example, simulation unit 900 may include housing 902, control panel 904, display 906, processor unit 908, number of storage devices 910, power sensor 912, interface system 914, and power connector 916.

Housing 902 may have a shape and/or size suitable for the particular purpose of simulation unit 900. For example, if simulation unit 900 is for use in training purposes, housing 902 may be adapted to allow for rack mounting or some other mounting of housing 902 in an aircraft. When simulation unit 900 is used in maintenance operations, housing 902 may be designed to allow for portability to allow housing 902 to be moved to a location at which a weapons interface may be present.

Control panel 904 may allow a user to interact with simulation unit 900. Control panel 904 may allow a user to generate user input to control a simulation performed by simulation unit 900. Display 906 may be used to provide information to the user. This information may be, for example, an identification of operations and/or signals being simulated for a control station, a response generated by the control station, and/or other suitable information.

Interface system 914 provides a capability to connect simulation unit 900 to a link system for a control station. Interface system 914 may contain number of connectors 918. Number of connectors 918 may be at least one of number of receptacles 920, number of umbilical connectors 922, and/or any other suitable types of connectors.

In these illustrative examples, number of connectors 918 may provide a capability to connect simulation unit 900 to a control station from a location within the aircraft. This connection may be made by connecting number of connectors 918 to a link system with the control station. This location may be, for example, a training station within the aircraft. Number of umbilical connectors 922 may provide a capability to connect simulation unit 900 to a weapons interface. With this type of connection, simulation unit 900 may be used in maintenance operations.

Processor unit 908 may execute program code 924 for simulation program 926. Program code 924 may be stored on one or more of number of storage devices 910. For example, program code 924 may be stored on a hard disk that may be loaded on a random access memory for execution by processor unit 908. Processor unit 908 may be a number of processors, a multi-core processor, or some other suitable type of processor architecture, depending on the particular implementation.

Further, processor unit 908 may be implemented using a number of heterogeneous processor systems in which a main processor is present with secondary processors on a single chip. As another illustrative example, processor unit 908 may be a symmetric multi-processor system containing multiple processors of the same type.

Number of storage devices 910 may be any piece of hardware capable of storing information. This information may be, for example, without limitation, data, program code in functional form, and/or other suitable information either on a temporary and/or permanent basis. For example, without limitation, number of storage devices 910 may include, for example, without limitation, a random access memory, a read-only memory, a solid state drive, a flash memory, a hard disk drive, a rewritable optical disk, a rewritable magnetic tape, and/or some other suitable type of storage device.

In these illustrative examples, processor unit 908 is capable of executing program code 924 for simulation program 926 to generate simulations 928 of a weapon. In these illustrative examples, simulation program 926 may execute on processor unit 908 to receive number of input signals 930. Number of input signals 930 may be processed by simulation program 926 for simulations 928 to generate output in the form of number of output signals 932. Number of input signals 930 may be received from a control station.

Number of input signals 930 may be generated at the control station in response to an operator manipulating controls at the control station. Number of output signals 932 may be sent back to the control station for presentation to the operator at the control station.

Power sensor 912 may be used to detect whether sufficient power is supplied by the control station. In this example, power sensor 912 may detect three-phase power generated by the control station. Simulation program 926 may determine whether the power delivered by the control station is sufficient for use in operating a weapon.

Further, program code 924 may be delivered to number of storage devices 910 for execution by processor unit 908 through transfer directly by interface system 914. In other advantageous embodiments, computer program product 934 may be placed in communication with processor unit 908 to download program code 936 stored on computer readable storage media 938 for use in simulation unit 900.

In these different illustrative examples, program code 924 and program code 936 are located in a functional form. In other words, program code 924 and program code 936 are in a form that may be executed by processor unit 908. Computer readable storage media 938 may be selectively removable and may be loaded onto and/or transferred to simulation unit 900 through interface system 914. Examples of computer readable storage media include, for example, without limitation, an optical disk, a magnetic disk, a thumb drive, a hard disk, a flash memory, or some other suitable type of storage device that may be placed in communication with processor unit 908.

In other advantageous embodiments, program code 936 may be downloaded to processor unit 908 and stored on number of storage devices 910 over a network from a server to simulation unit 900. The data processing system providing program code 924 may be, for example, a server computer, a client computer, and/or some other suitable device capable of storing and transmitting program code 924 to simulation unit 900.

The different components illustrated for simulation unit 900 are not meant to provide architectural limitations to the manner in which different advantageous embodiments may be implemented. Different advantageous embodiments may be implemented in a computer, a data processing system, and any other suitable device that may have components in addition to or in place of those illustrated for simulation unit 900. Other components in simulation unit 900 may be varied from the illustrative examples shown.

Figure 10:
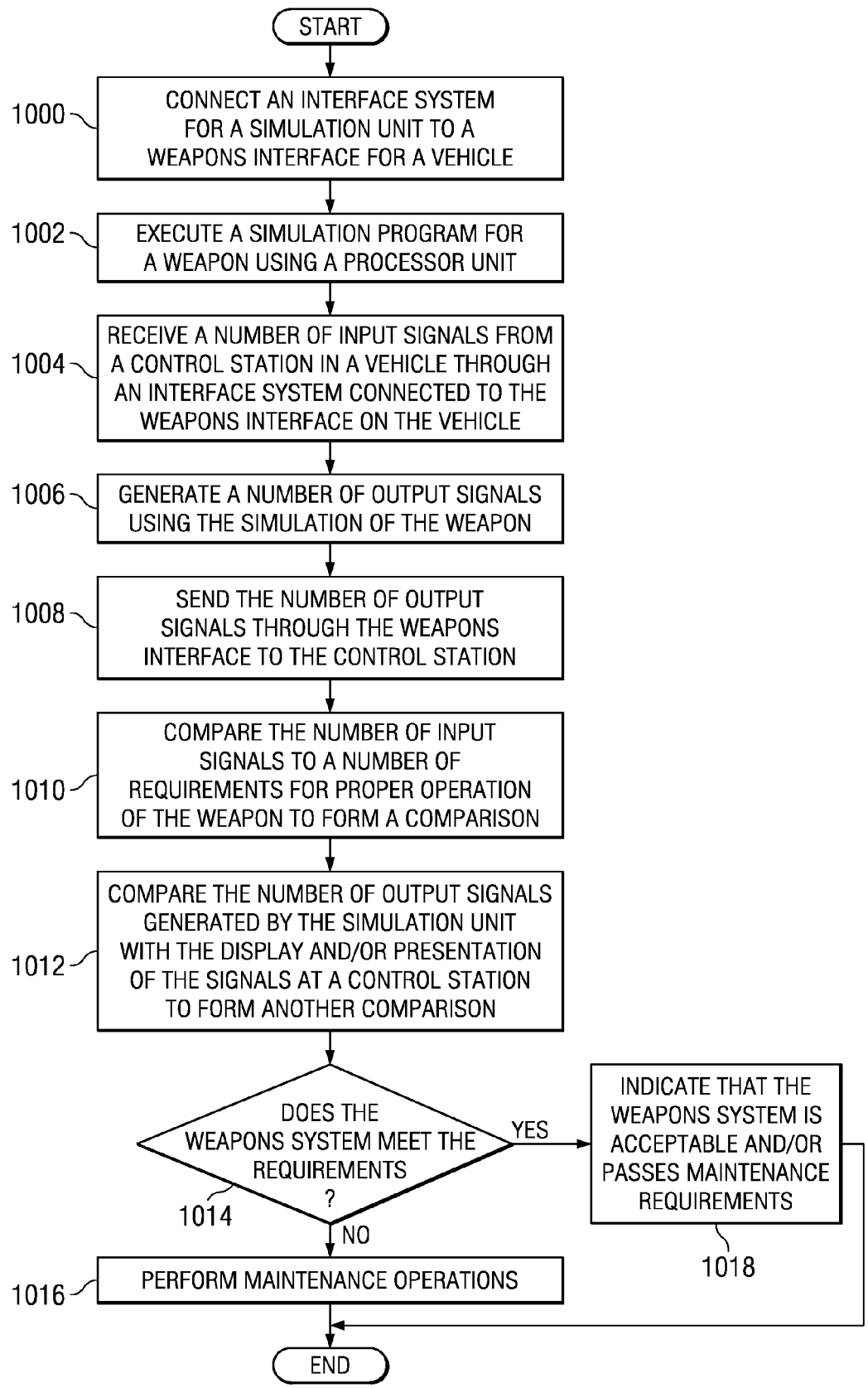
FIG. 10 is a flowchart for simulating a missile for maintenance operations in accordance with an advantageous embodiment.

With reference now to FIG. 10, an illustration of a flowchart for simulating a missile for maintenance operations is depicted in accordance with an advantageous embodiment. The process illustrated in FIG. 10 may be implemented in an environment such as, for example, simulation environment 300 in FIG. 3. The process begins by connecting an interface system for a simulation unit to a weapons interface for a vehicle (operation 1000).

The process executes a simulation program for a weapon using a processor unit (operation 1002). The process receives a number of input signals from a control station in a vehicle through an interface system connected to the weapons interface on the vehicle (operation 1004). The interface system is in communication with the processor unit.

The process generates a number of output signals using the simulation of the weapon (operation 1006). The number of output signals is sent through the weapons interface to the control station (operation 1008).

In these examples, the number of input signals may be for a number of actions performed to release the weapon. These signals may be generated during a maintenance operation to determine whether the control station is operating properly. The number of actions may include, for example, at least one of a power up, a mission plan in download, a global positioning signal download, a launch preparation, a launch, a reset, and a weapons release check.

The process then compares the number of input signals to a number of requirements for proper operation of the weapon to form a comparison (operation 1010). The process may also compare the number of output signals generated by the simulation unit with the display and/or presentation of the signals at a control station to form another comparison (operation 1012).

Thereafter, a determination is made as to whether the weapons system meets the requirements to operate the weapon from the comparison (operation 1014). This determination may be made by analyzing at least one of the comparisons made in operation 1010 and operation 1012. One or both of the comparisons should provide the expected responses and outputs that are needed for the weapons system to pass inspection and/or be considered capable of being used to operate a weapon.

A failure to meet the requirements may indicate a problem and/or anomaly within the weapons system. For example, the anomaly may be present in the control station, the weapons interface, the link between the control station, the umbilical cable, the weapons interface, and/or some other component in the weapons system. If the weapons system does not meet the requirements for proper operation of the weapon from the comparisons, maintenance operations may be performed (operation 1016), with the process terminating thereafter.

With reference again to operation 1014, if the weapons system meets the requirements to operate the weapon, an indication that the weapons system is acceptable and/or passes maintenance requirements is made (operation 1018), the process terminating thereafter.

Figure 11:
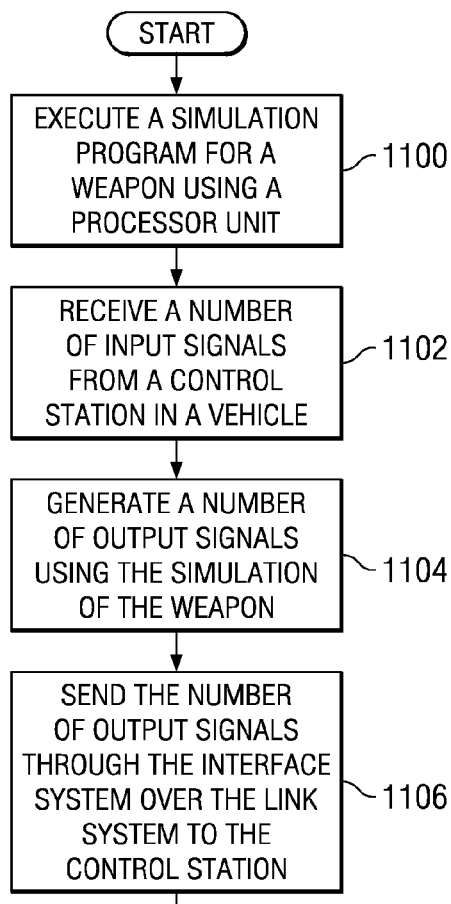
FIG. 11 is a flowchart of a process for simulating a missile in accordance with an advantageous embodiment.

With reference now to FIG. 11, a flowchart of a process for simulating a missile is depicted in accordance with an advantageous embodiment. The process illustrated in FIG. 11 may be implemented using a simulation environment such as, for example, simulation environment 300 in FIG. 3.

The process begins by executing a simulation program for a weapon using a processor unit (operation 1100). The process receives a number of input signals from a control station in a vehicle (operation 1102). The interface system is in communication with the processor unit using a first link system that is separate from a second link system through a weapons interface in the vehicle.

The process generates a number of output signals using the simulation of the weapon (operation 1104). The number of output signals are sent through the interface system over the link system to the control station (operation 1106), with the process terminating thereafter.

Figure 12:
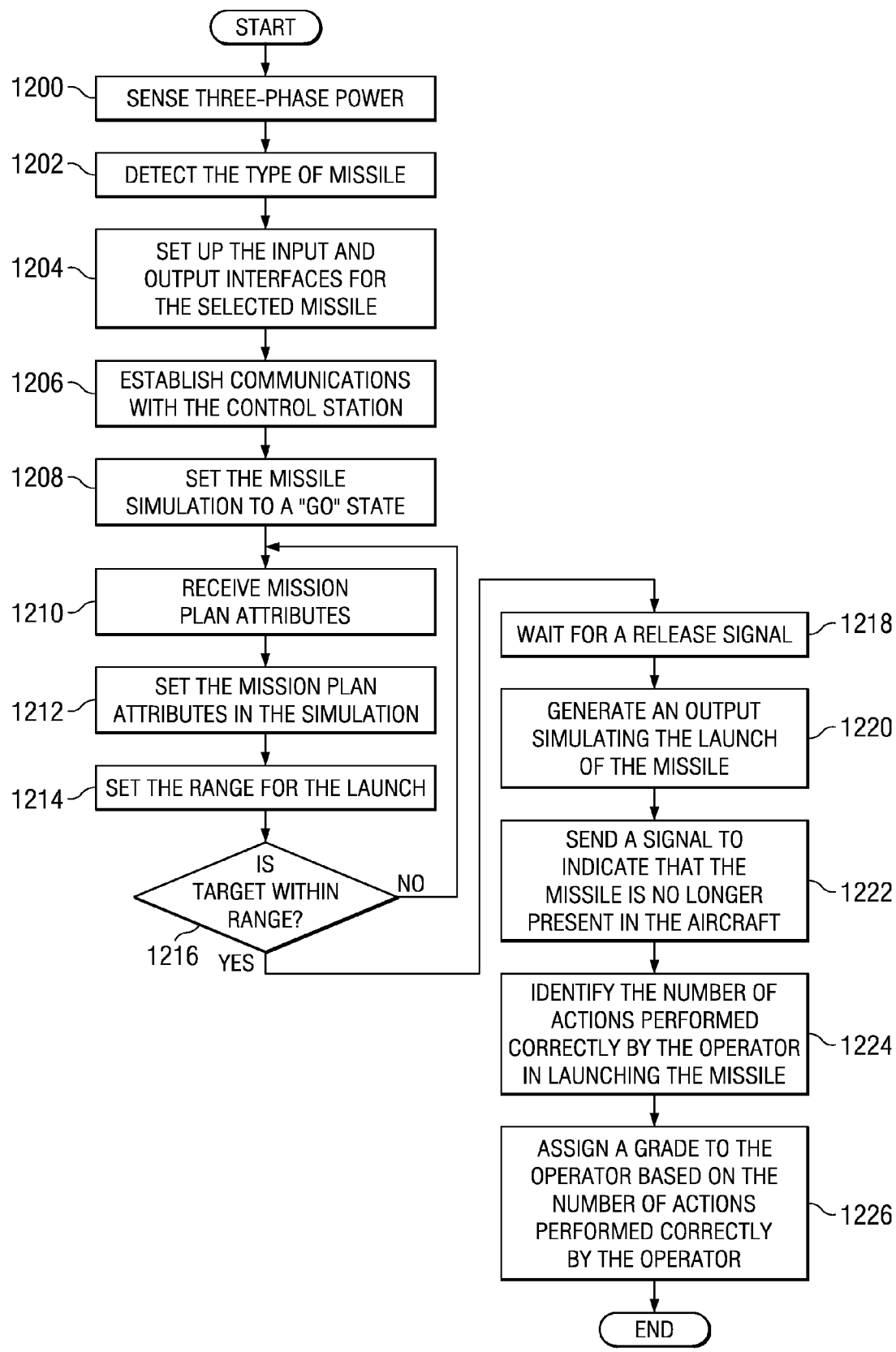
FIG. 12 is a flowchart of a process for simulating a missile for training in accordance with an advantageous embodiment.

Turning now to FIG. 12, a flowchart of a process for simulating a missile for training is depicted in accordance with an advantageous embodiment. The process illustrated in FIG. 12 may be implemented in a simulation environment such as, for example, simulation environment 300 in FIG. 3. In particular, these processes may be implemented as part of a simulation program such as, for example, simulation program 926 in FIG. 9.

Further, some of the different operations illustrated herein may be implemented using operator actions in addition to or in place of operations performed by the simulation program being executed on a processor unit. In particular, this process may be used to simulate a harpoon missile.

The process begins by sensing three-phase power (operation 1200). This operation may be performed to determine whether sufficient power is being supplied by the control station. Next, the process detects the type of missile (operation 1202). This missile type may be determined based on user input. For example, an instructor may select a Harpoon Block II missile or a Harpoon Block III missile in these examples.

The process then sets up the input and output interfaces for the selected missile (operation 1204). This operation may select an active interface, such as a particular connector for the selected missile.

Next, the process establishes communications with the control station (operation 1206). This operation may include, for example, providing a display of the missile status at the control station. In these illustrative examples, the process may send a 16 bit data word containing different fields that identify the type of missile with which the control station is communicating.

The process sets the missile simulation to a "go" state (operation 1208). In this state, the process sends output signals indicating that the missile can be used. The process then receives mission plan attributes (operation 1210). In this operation, the process receives inputs from an operator at the control station that sets the mission plan. This mission plan may be, for example, a range and bearing, a location of the target, or some other suitable information for the mission plan.

The process sets the mission plan attributes in the simulation (operation 1212). The process then sets the range for the launch (operation 1214).

A determination is made as to whether the target is within range (operation 1216). If the target is out of range, the process returns to operation 1210. Otherwise, the process waits for a release signal (operation 1218). In operation 1218, the process waits for a signal from the control station indicating that the missile should be launched and/or released from the aircraft.

Upon receiving a release signal, the process generates an output simulating the launch of the missile (operation 1220). In operation 1220, output signals may be sent to the control station to simulate the communication and/or information sent to the control station from the missile in response to being released. These signals may include a missile enabled, a missile battery up, a missile ready, and other signals that may be generated by the missile when being launched. Thereafter, the process sends a signal to indicate that the missile is no longer present in the aircraft (operation 1222).

The process then identifies the number of actions performed correctly by the operator in launching the missile (operation 1224). A grade is assigned to the operator based on the number of actions performed correctly by the operator (operation 1226), with the process terminating thereafter.

The different operations illustrated in FIG. 12 are examples of some actions that may be taken to perform training using a simulation unit and a control station in an aircraft. The different advantageous embodiments may have other operations in addition to or in place of the ones illustrated.

For example, the different advantageous embodiments may include operations to provide training on operating multiple missiles at the same time, rather than a single missile. Further, in other advantageous embodiments, this process may be used to provide training for other types of weapons other than a harpoon missile.

Figure 13:
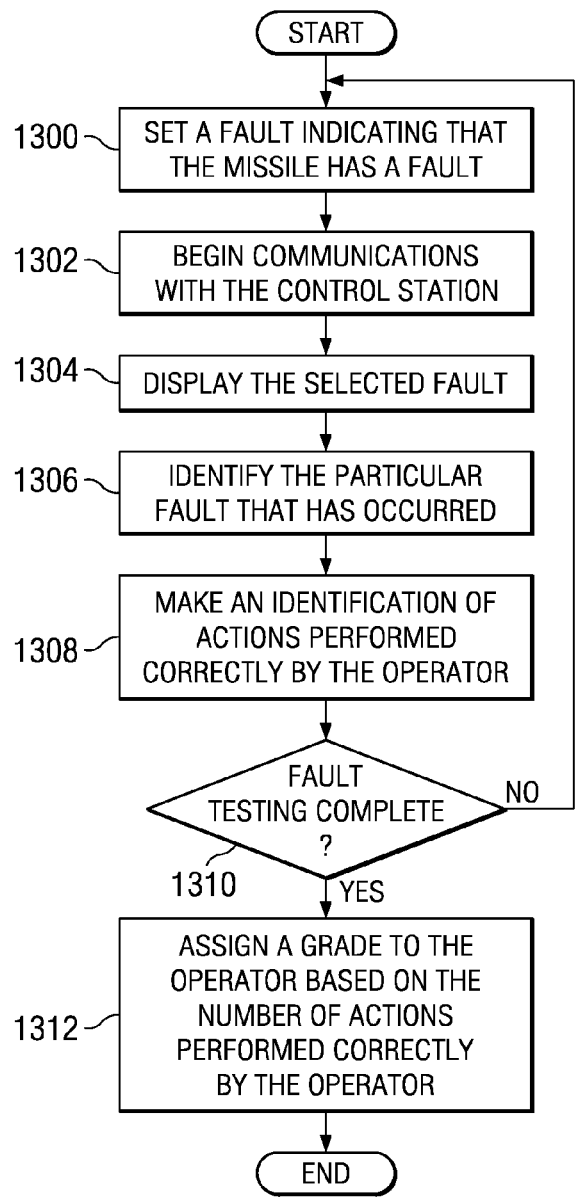
FIG. 13 is a flowchart of a process for simulating a missile for training in accordance with an advantageous embodiment.

With reference now to FIG. 13, a flowchart of a process for simulating a missile for training is depicted in accordance with an advantageous embodiment. The process illustrated in FIG. 13 may be implemented in a simulation environment such as, for example, simulation environment 300 in FIG. 3. This process may be used to train an operator to handle faults that may occur while operating a missile.

In this illustrative example, faults may be simulated to determine whether the operator can recognize the particular faults that may be generated by a missile.

The process begins by setting a fault indicating that the missile has a fault (operation 1300). This signal may be generated by the instructor inputting a particular fault. The process then begins communications with the control station (operation 1302). In operation 1302, the missile status may be presented to the operator at the control station.

The process displays the selected fault (operation 1304). The selected fault may be, for example, an absence of appropriate power when the operator at the control station attempts to select the missile. In this example, the missile may be unselectable indicating that the missile is unsafe. The operator at the control station may then identify the particular fault that has occurred (operation 1306). The instructor may record the fault identified by the operator. An identification of actions performed correctly by the operator is made (operation 1308).

Next, a determination is made as to whether the fault testing has completed (operation 1310). If the fault testing has completed, a grade is assigned to the operator based on the number of actions performed correctly by the operator (operation 1312), with the process terminating thereafter. With reference again to operation 1310, if testing has not been completed, the process returns to operation 1300 to receive another fault selection by the operator.

A similar set of processes in FIGS. 12 and 13 may be applied to perform maintenance operations on a weapons system. These different tests may be performed using a simulation unit to determine whether the control station provides the appropriate signals to the missile and can display the appropriate responses from the missile through the simulation provided by the simulation unit. With this type of implementation, the operator is a maintenance person who may be looking for various responses needed to determine whether the weapons system meets requirements for proper operation of the weapon.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

As a specific example, in some advantageous embodiments, operations in the flowcharts for identifying correction actions and/or grading may be omitted. In yet other advantageous embodiments, operations from FIGS. 12 and 13 may be combined and/or mixed.

Thus, the different advantageous embodiments provide a method and apparatus for simulating a weapon. The different advantageous embodiments provide a capability to simulate a weapon, such as a missile, in a manner that may be used for training and/or maintenance operations. When training an operator, the simulations unit may be connected to a control station through a communications link that may be common to a communications link used between the control station and a weapons interface. When performing maintenance operations, the simulation unit may be connected to the weapons interface to insure that the signals are being sent properly along the communications link in addition to proper operation of the control station.

The different advantageous embodiments may provide trained operators of weapons systems without using actual weapons. Further, the different advantageous embodiments also may avoid the limitations of a simulator that simulates the control station on the ground. Further, the different advantageous embodiments may provide a capability to more quickly and/or less expensively perform maintenance operations on a weapons system.

The different advantageous embodiments can take the form of an entirely hardware embodiment, an entirely software embodiment, or an embodiment containing both hardware and software elements. Some embodiments are implemented in software, which includes but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, a magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus comprising:
a housing;
a processor unit located within the housing and configured to communicate with a control station in a vehicle, wherein the control station is configured to control operation of an actual weapon, wherein the control sta- tion is in communication with the actual weapon, and wherein the actual weapon is connected to the vehicle;

a storage device located in the housing and in communication with the processor unit;

a simulation program stored on the storage device, wherein the simulation program is configured to be executed by the processor unit to process a second number of input signals received from the control station to simulate operation of the actual weapon; and a safety system located within the housing and configured to prevent generation of a number of input signals by the control station to actually operate the actual weapon, to prevent communication of the simulation program with the actual weapon, and to prevent executing the simulation program when the actual weapon is present at the weapons interface.

2. The apparatus of claim 1 further comprising:
an interface system, wherein the interface system is configured to be connected to a weapons interface on the vehicle, wherein the weapons interface is configured to connect the actual weapon to the vehicle, wherein the weapons interface is configured to receive the number of input signals from the control station and send the number of output signals to the control station.

3. The apparatus of claim 1, wherein the housing is located at a simulation station inside an aircraft and further comprising:
an interface system located in the housing, wherein the interface system is connected to the control station in the vehicle and is isolated from a weapons interface to the actual weapon controlled by the control station such that signals sent through the interface system do not reach the weapons interface.

4. The apparatus of claim 1, wherein the simulation comprises simulating at least one of a power up Bit, a mission plan and download, a global positioning system download, a launch preparation, a reset, a repetition, a weapon release and control check, and a ground testing for the actual weapon.

5. The apparatus of claim 1 further comprising:
the control station in the vehicle, wherein the control station is configured to generate the second number of input signals in response to a user input to the control station and configured to display the number of output signals generated by the simulation program when executed on the processor unit.

6. The apparatus of claim 1 further comprising:
a control panel on the housing, wherein the control panel is configured to be manipulated to make a modification to the simulation.

7. The apparatus of claim 6, wherein the control panel includes a display configured to display information about the simulation.

8. The apparatus of claim 6, wherein the modification comprises a simulated fault during simulated operation of the actual weapon.

9. The apparatus of claim 1, wherein the vehicle is an aircraft and further comprising:
the control station in the vehicle, wherein the control station is configured to generate the number of input signals in response to a user input and is configured to display the number of output signals generated by the simulation program; and
a control panel on the housing, wherein the control panel is configured to be manipulated to modify the simulation, wherein the modification comprises a simulated fault during simulated operation of the actual weapon.

10. The apparatus of claim 1 further comprising:
the vehicle, wherein the housing is located in the vehicle.

11. The apparatus of claim 10, wherein the housing is configured to be removed from the vehicle.

12. The apparatus of claim 10, wherein the vehicle is selected from one of a mobile platform, an aircraft, a surface ship, a tank, a personnel carrier, a train, a spacecraft, and a submarine.

13. A method for simulating operation of an actual weapon, wherein the actual weapon is connected to a vehicle via a weapons interface on the vehicle, and wherein the actual weapon is controlled by a control station connected to the vehicle, the method comprising:
executing a simulation program for the actual weapon using a processor unit in a simulation unit;
receiving, at the processor unit, a number of input signals from the control station through an interface system connected to the weapons interface, wherein the simulation program uses the number of input signals;
generating, by the processor unit, a number of output signals based on a simulation of the actual weapon conducted by the simulation program;
sending the number of output signals through the weapons interface to the control station; and
preventing the executing of the simulation program when the actual weapon is present at the weapons interface.

14. The method of claim 13 further comprising:
connecting the interface system to the weapons interface for the vehicle.

15. The method of claim 13, wherein the number of input signals is for simulation of a number of actions performed to release the actual weapon.

16. The method of claim 15, wherein the number of actions comprises at least one of a power up bit, a mission plan and download, a global positioning signal download, a launch preparation, a launch, a reset, and a weapons release and control check.

17. The method of claim 15 further comprising:
comparing the number of input signals to a number for proper operation of the actual weapon to form a comparison; and
determining whether the control station meets the number of requirements for the proper operation of the actual weapon from the comparison.

18. The method of claim 13, wherein the processor unit is located within a housing and is configured to communicate with the control station in the vehicle, wherein the processor unit is in communication with a storage device located in the housing; the simulation program is stored on the storage device; and the simulation program is configured to be executed by the processor unit to simulate actual operation of the actual weapon.

19. The method of claim 13 further comprising:
preventing, using the processor unit, generation of a second number of input signals by the control station to actually operate the actual weapon; and
preventing, using the processor unit, communication of the simulation program with the actual weapon.

20. The method of claim 13, wherein executing the simulation program further comprises introducing a simulated fault during simulated operation of the actual weapon.

* * * * *